Jan. 5, 1965     D. L. BILSING ETAL     3,163,917
MINIATURE CAPACITOR ASSEMBLY METHOD
Filed May 22, 1962
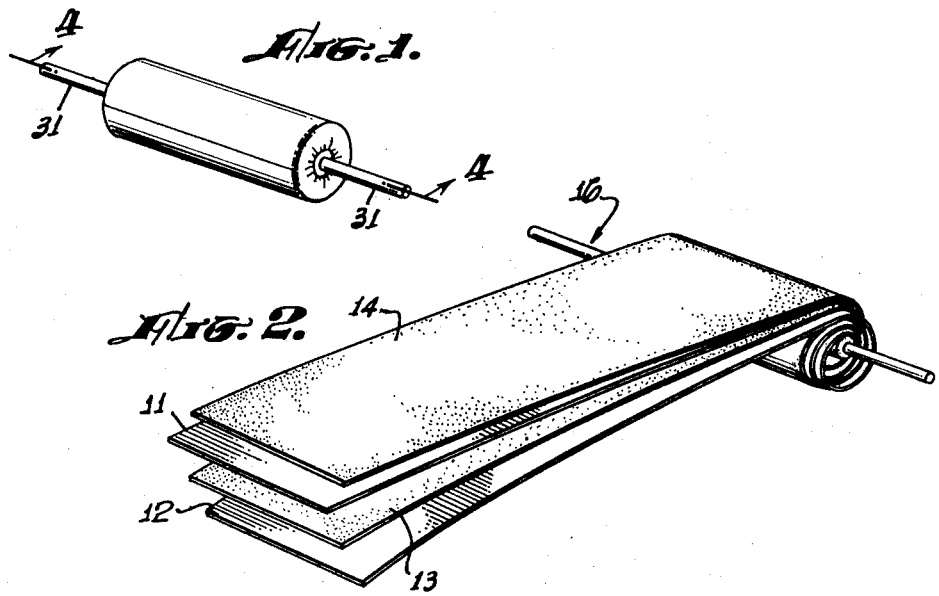
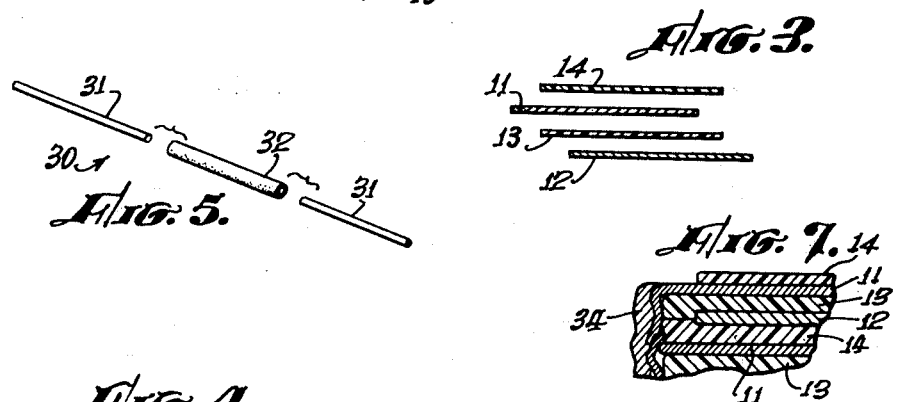
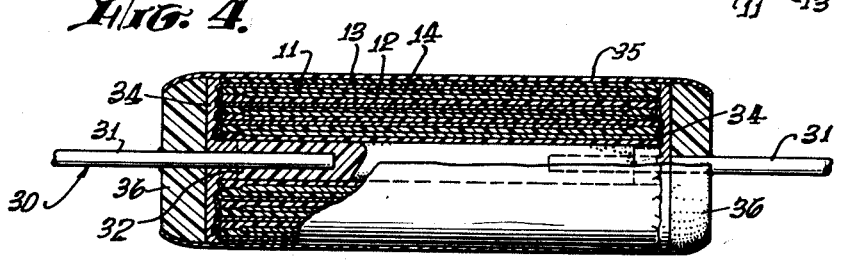
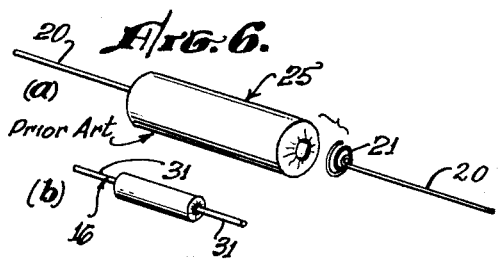
DONALD L. BILSING,
MARVIN G. KESLER,
INVENTORS.
BY THEIR ATTORNEYS.
Spensley & Horn.

United States Patent Office 3,163,917
Patented Jan. 5, 1965

3,163,917
MINIATURE CAPACITOR ASSEMBLY METHOD
Donald L. Bilsing and Marvin G. Kesler, Ogallala, Nebr., assignors, by mesne assignments, to Thompson Ramo Wooldridge Inc., Euclid, Ohio, a corporation of Ohio
Filed May 22, 1962, Ser. No. 196,712
4 Claims. (Cl. 29—25.42)

This invention relates to electrical capacitors and more particularly to the fabrication of improved miniature capacitors.

This invention is specifically directed toward the miniaturization of the type of capacitor formed by rolling two metallic foil ribbons separated by plastic or paper ribbon into a compact cylinder. Electrical connection to this wound ribbon type of capacitor is made by lead wires extending from the ends of the cylinder, each lead wire being bonded to a different one of the foil ribbons. The two metallic foil ribbons are slightly laterally displaced from each other and from the dielectric ribbons during winding so that an edge surface of one of the foil ribbons projects at one end of the cylinder and an edge surface of the other foil ribbon projects at the other end of the cylinder. The projecting edge surfaces of the foil at the ends of the cylinder facilitate separate electrical connection to each of the foil ribbons. In accordance with present art practice, each lead wire is supported only by the bonded joint (usually solder or conductive cement) between the lead wire and the foil end surface of the cylinder, thereby necessitating a relatively large contact area between them in order to insure adequate structural strength. It has been found that in order to achieve a sufficiently large contact area to insure adequate structural strength, the wound cylinder capacitor body must currently be of a diameter not less than 3/16 inch, i.e. a circular contact area of 3/16 inch minimum diameter must be provided. A common method of achieving the required contact area is to wind one end portion of each lead wire into a planar tight spiral and abut the spiral portion against the foil end surface of the cylinder. Also, prefabricated lead wires having an expanded end portion in the form of a tab or in the form of a transverse projection similar to the head on a nail can be utilized. For capacitors of certain capacitance values and voltage ratings, a winding diameter of substantially less than 3/16 inch would be possible using the regular foil and dielectric ribbons. In such cases, in order to maintain the minimum 3/16 inch cylinder diameter, the winding layer thickness is increased by utilizing a dielectric ribbon thickness greater than that required for the desired voltage rating and/or a greater than normal foil thickness. It is thus readily apparent that the present art wound ribbon capacitor structure is not particularly suitable for use in capacitors of relatively low capacitance and voltage ratings. The present art wound capacitors are ordinarily not manufactured in capacitance values less than 1,000 micromicrofarads, a bulkier plate type of construction being commonly used for capacitors below this value. Furthermore, the present art technique of building up the winding layer thickness in low capacitance value wound capacitors creates problems of capacitance stability and drift due to winding bulk.

In accordance with the current trend toward miniaturization of electronic components for use in aircraft and missiles, it is desirable to provide a miniature wound ribbon type capacitor of high mechanical strength, reliability and shock resistance. In view of the foregoing discussion, it is easily seen that the present art wound ribbon capacitor structure is not suited for miniaturization, particularly since with winding diameters less than about 3/16 inch, it is currently necessary to handle each capacitor assembly very gently during fabrication upon attachment of the electrical leads to avoid breakage of the assembly during subsequent fabrication steps. The present invention is directed toward providing a novel miniature wound ribbon capacitor structure capable of easy fabrication and possessing the characteristics of high mechanical strength, reliability and shock resistance.

The primary purpose of the present invention is to provide a miniature capacitor assembly method.

It is therefore an object of the present invention to provide an improved capacitor.

It is also an object of the present invention to provide an improved miniature capacitor.

It is another object of the present invention to provide an improved miniature wound ribbon capacitor.

It is a further object of the present invention to provide a miniature wound ribbon capacitor of great structural strength.

It is yet another object of the present invention to provide a miniature wound ribbon capacitor characterized by high stability of capacitance.

It is a still further object of the present invention to provide a drift free, miniature wound ribbon capacitor.

It is also an object of the present invention to provide a wound ribbon type of capacitor structure suitable for use in capacitors having a capacitance value below 1,000 micromicrofarads and with voltage ratings below 1,000 volts D.C.

It is still another object of the present invention to provide a miniature wound ribbon capacitor structure characterized by high shock resistance and reliability.

It is a further object of the present invention to provide an easily fabricable miniature wound ribbon capacitor requiring no special handling during fabrication.

The objects of the present invention are accomplished, in general, by a wound ribbon capacitor structure wherein wire electrical leads are secured at one of their ends to a mounting member of insulating material disposed within the capacitor winding. The capacitor winding may be wound directly on the mounting member or, alternatively, may be wound on a winding mandrel and then withdrawn from the mandrel and affixed onto the mounting member.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a perspective view of a miniature, wound ribbon capacitor in accordance with the present invention;

FIGURE 2 is a pictorial view depicting the winding of the present invention capacitor;

FIGURE 3 is an elevation view, in cross section, of a winding layer of the capacitors of FIGURES 1 and 2;

FIGURE 4 is a view taken along the line 4—4 of FIGURE 1;

FIGURE 5 is an exploded view of a lead assembly for use in the present invention capacitor;

FIGURE 6 is a pictorial view depicting the relative size of a present invention capacitor as compared with a typical prior art capacitor of the same capacitance and voltage rating, (a) depicting the prior art capacitor and (b) depicting the present invention capacitor; and, FIGURE 7 is an enlarged, partial sectional view, illustrating one end of the capacitor body of FIGURE 1.

Turning now to the drawings, and referring specifically to FIGURES 2 and 3 thereof, there is illustrated the method by which the present capacitor is wound, the method being generally in accordance with present art practices. The two plates of the capacitor are formed by metal foil ribbons 11 and 12, the ribbons being separated by a ribbon 13 of flexible dielectric material. The foils are typically tin or aluminum foil ribbons of 0.002 inch or greater thickness. The minimum thickness of the dielectric ribbons is dependent upon the desired capacitor voltage rating, the dielectric material being used ("Mylar" being presently preferred), and the physical relationship of the dielectric ribbons with respect to the foil ribbons.

An additional dielectric ribbon 14 is placed above the foil ribbon 11 to insulate adjacent winding layers and to contribute toward the total capacitance since it provides the dielectric between the foil ribbon 11 and the overlying foil ribbon 12 in the next succeeding winding layer. The ribbons 11–14 are usually of substantially equal width and, as shown in FIGURE 3, are slightly laterally displaced from each other so that an edge surface of the metal foil 11 forms one edge surface of each winding layer and an edge surface of the metal foil 12 forms the other edge of each winding layer. The distance by which the edge of a metal foil projects beyond the edge of a dielectric ribbon is commonly termed the "foil extension." The difference by which the edge of a dielectric ribbon projects beyond the edge of a metal foil is commonly termed the "insulating margin." In accordance with present art practices, a foil extension of $\frac{1}{16}$ inch is commonly utilized, a $\frac{1}{32}$ inch extension being occasionally employed. It is common practice to utilize an insulating margin of $\frac{1}{16}$ inch for a 100 volt D.C. rated capacitor.

The assemblage of foil and dielectric ribbons, arranged as shown in FIGURE 3, is wound upon a thin cylindrical winding mandrel 16, as indicated in FIGURE 2. During the winding operation, care is taken to insure that each winding layer is positioned directly above the underlying layer so that the projecting edge surfaces of the foil strips 11 and 12 are maintained in substantially perfect alignment. Upon completion of the winding operation, the resulting cylindrical tubular capacitor body is withdrawn from the mandrel.

To establish electrical connection to the margins of each of the foil strips, it is typical current practice to wind an end portion of a lead wire into a planar tight spiral and press the spiral in abutting relationship against the projecting foil extensions at one end of the cylinder to squash the extensions into a generally flat surface, the spiral portion of the lead wire then being ohmically bonded to the generally flat end surface of the cylinder, such as by soldering. This prior art method of the connection is illustrated in FIGURE 6(a) which shows a capacitor body 25 having electrical leads 20 coaxially projecting from opposite ends thereof, the electrical leads 20 having a spiral end portion 21 wound thereon. The electrical leads 20 are typically of 18–24 gauge and the diameter of the spiral end portion 21 is typically on the order of about $\frac{3}{16}$ inch for a two-turn spiral. In accordance with present art practices, for a capacitor body diameter on the order of $\frac{3}{16}$ inch, the foil extensions are typically on the order of $\frac{1}{16}$ inch to provide enough foil edge area exposure to obtain a lead-to-foil solder or conductive cement joint with the necessary physical strength. As indicated above, for certain capacitors of low capacitance values and voltage ratings, a winding diameter of substantially less than $\frac{3}{16}$ inch would be possible using the regular foil and plastic ribbon dielectric thicknesses. In such cases, the winding layer thickness is increased in order to obtain the minimum $\frac{3}{16}$ inch cylinder diameter, thereby creating problems of capacitance stability and drift due to winding bulk.

In accordance with the present invention concepts, the structural rigidity of the lead termination does not depend upon the contact area of the foil edge surfaces, thereby permitting a significant reduction in foil extension and capacitor body diameter. This is achieved by a compact and structurally rigid lead assembly in which the electrical lead wires are maintained in the desired relationship. In FIGURE 5 of the drawing, there is shown an exploded view of such a lead assembly, the lead assembly being generally indicated by the reference numeral 30. The lead assembly 30 consists of two electrical leads 31 inserted into opposite ends of a mounting member, which in the illustrated embodiment consists of a small diameter insulating tube 32. The electrical leads 31 are maintained in coaxial, spaced apart relationship in the tube 32 by epoxy cement or other suitable insulative bonding material. An electrically conductive bonding material is used to form the electrical contact between the electrical leads and the capacitor foil. Hence, the length of the tube 32 is less than the length of the cylindrical tubular capacitor body in order to provide a recess or well into which the electrically conductive bonding material can flow during its application, to enhance the strength and reliability of the electrical connection. The outer diameter of the tube 32 is slightly less than the diameter of the winding mandrel 16 so that the lead assembly 30 may be inserted into the central opening of the capacitor body, a tubing o.d. of 0.04 inch being presently preferred for use with 24 gauge lead wires. Through the use of the lead assembly 30, a compact and strong structure is achieved. Since the foil extensions are no longer relied upon for structural rigidity in the mounting of the lead wires, the extensions can be significantly reduced, thereby facilitating a much smaller capacitor winding diameter. In the present invention capacitor structure, the foil extension is typically on the order of from 0.005 inch to 0.015 inch, as compared with the usual $\frac{1}{16}$ inch foil extension of the prior art wound capacitors. Also, a smaller insulating margin can be used, a $\frac{1}{32}$ inch margin being suitable for a 100 volt D.C. rating capacitor, as compared with the $\frac{1}{16}$ inch insulating margin of prior art wound capacitors of a similar voltage rating.

In the manufacture of the present invention capacitor, upon completion of the capacitor winding operation, the winding is removed from the mandrel 16 and the lead assembly 30 inserted therein. The resulting capacitor assembly is then placed in an oven and heated to cause shrinkage of the Mylar dielectric ribbons 13 and 14 tightly around the tube 32. The foil extensions are then pressed down and electrically conductive epoxy solder 34 applied to each end to establish electrical contact between each of the lead wires 31 and its respective foil end. The pressing down and squashing of the foil extensions, in conjunction with the shrinkage of the insulating margins, provides a sealing effect so that no significant short circuiting of the foils 11 and 12 by the solder occurs (see the enlarged view of FIGURE 7).

The unit is then placed in a sleeve of shrinkable Mylar tubing and the ends sealed with epoxy or other suitable plastic, the resulting capacitor structure being shown in the sectional view of FIGURE 4. In the view of FIGURE 4, the Mylar outer sleeve is indicated by the reference numeral 35 and the end sealing plastic by the reference numeral 36.

The completed capacitor is shown in FIGURE 1 of the drawings. A typical present invention overall capacitor length is on the order of 0.375 inch, with a diameter substantially less than 0.125 inch. A capacitor diameter on the order of 0.08 inch is readily achievable for a 100 volt D.C. capacitor rating using the present invention technique. The present invention technique is most advantageous for use in capacitors with a capacitance value below 0.1 microfarad, and with voltage ratings below 1,000 volts D.C. In the presently preferred embodiment of this invention, an axial pull force of at least four pounds may be withstood by the leads.

As an alternative method of construction, the lead assembly 30 could be utilized as the winding mandrel and the foil and dielectric layers wound directly upon the tube 32. The use of a heat-shrinkable dielectric material results in a particularly solid and rigid capacitor body and provides improved capacitance stability and drift characteristics. The presently preferred material for the tube 32 is the well-known "Kel–F" tubing, although any suitable insulating material or molding with sufficient rigidity and strength can be utilized for the lead mounting member. Furthermore, the lead mounting member need not be of a tubular form nor need it be of uniform circular cross section; other suitable forms will be apparent to those skilled in the art. For example, the lead mounting member might be a solid body of insulating material with the lead wires cemented into suitable apertures or grooves therein or bonded to the member in a structurally strong joint by other suitable means. Also, although in the illustrated embodiment, the electrical lead wires extend coaxially from each end of the tubular capacitor body, it is readily apparent that with other suitable mounting member configurations the leads may extend radially or angularly from the ends of the capacitor body.

The use of an insulating sleeve 35 in the illustrated embodiment is a presently preferred method of encapsulation, although other forms of outer coverings, such as tape wrappings, plastic dip coatings, etc. can be utilized. Alternatively, use without a casing is also possible. Hence, although the invention has been described with a certain degree of particularity, it is understood that the present disclosure has been made only by way of example and that numerous changes in the combination and arrangement of parts may be resorted to without departing from the spirit and the scope of the invention as hereinafter claimed.

What is claimed is:
1. The method of fabricating a strip wound miniature electrical capacitor, comprising the steps of:
   (a) simultaneously winding flexible electroconductive material and flexible dielectric material upon a mandrel to form a capacitor body, each winding layer including two ribbons of flexible electroconductive material insulatively separated by a ribbon of flexible dielectric material and with adjacent winding layers insulatively separated by another ribbon of flexible dielectric material;
   (b) rigidly securing one end of a first electrical lead wire to one end of a member of electrical insulating material of a predetermined outside dimension less than the transverse dimension of said mandrel, and rigidly securing one end of a second electrical lead wire to the other end of said member to thereby form a rigid lead assembly;
   (c) removing the wound capacitor body from said mandrel and inserting said rigid lead assembly within said capacitor body so that said member of electrical insulating material is disposed coaxially within said capacitor body with said first lead wire projecting from one end of said capacitor body and said second lead wire projecting from the other end of said capacitor body;
   (d) ohmically bonding said first lead wire to one of said ribbons of electroconductive material; and,
   (e) ohmically bonding said second lead wire to the other of said ribbons of electroconductive material.
2. The method of fabricating a strip wound miniature electrical capacitor, comprising the steps of:
   (a) simultaneously winding flexible electroconductive material and flexible dielectric material upon a cylindrical mandrel to form the cylindrical tubular body of said capacitor, each winding layer including two ribbons of flexible electroconductive material insulatively separated by a ribbon of flexible dielectric material and with adjacent winding layers insulatively separated by another ribbon of flexible dielectric material;
   (b) axially securing one end of a first electrical lead wire within one end of a cylinder of electrical insulating material of a predetermined diameter less than the diameter of said winding mandrel, and axially securing one end of a second electrical lead wire within the other end of said cylinder to thereby form a rigid lead assembly;
   (c) removing the wound capacitor body from said mandrel and securing said rigid lead assembly within said capacitor body so that said cylinder of electrical insulating material is disposed coaxially within said tubular capacitor body with said first lead wire projecting from one end of said capacitor body and said second lead wire projecting from the other end of said capacitor body;
   (d) ohmically bonding said first lead wire to one of said ribbons of electroconductive material; and,
   (e) ohmically bonding said second lead wire to the other of said ribbons of electroconductive material.
3. The method of fabricating a strip wound miniature electrical capacitor, comprising the steps of:
   (a) simultaneously winding flexible electroconductive material and flexible dielectric material upon a cylindrical mandrel to form the cylindrical tubular body of said capacitor, each winding layer including two ribbons of flexible electroconductive material insulatively separated by a ribbon of flexible heat-shrinkable dielectric material and with adjacent winding layers insulatively separated by another ribbon of flexible heat-shrinkable dielectric material;
   (b) axially securing one end of a first electrical lead wire within one end of a cylinder of electrical insulating material of a predetermined diameter less than the diameter of said winding mandrel, and axially securing one end of a second electrical lead wire within the other end of said cylinder to thereby form a rigid lead assembly;
   (c) removing the wound capacitor body from said mandrel and assembling said rigid lead assembly within said capacitor body so that said cylinder of electrical insulating material is disposed coaxially within said tubular capacitor body with said first lead wire projecting from one end of said capacitor body and said second lead wire projecting from the other end of said capacitor body;
   (d) maintaining the resulting assemblage at a predetermined elevated temperature until said heat-shrinkable dielectric material shrinks sufficiently to contract said tubular capacitor body tightly around said cylinder of electrical insulating material;
   (e) ohmically bonding said first lead wire to one of said ribbons of electroconductive material; and,
   (f) ohmically bonding said second lead wire to the other of said ribbons of electroconductive material.
4. The method of fabricating a strip wound miniature electrical capacitor, comprising the steps of:
   (a) winding flexible electroconductive material and flexible dielectric material upon a mandrel to form a capacitor body, each winding layer including two ribbons of flexible electroconductive material insulatively separated by a ribbon of flexible dielectric material;
   (b) rigidly securing a first electrical lead wire to a member of electrical insulating material of a predetermined outside dimension less than the transverse dimension of said mandrel, and rigidly securing a second electrical lead wire to said member in spaced apart relationship from said first electrical lead wire to thereby form a rigid lead assembly;

(c) removing the wound capacitor body from said mandrel and inserting said rigid lead assembly with said capacitor body so that said member of electrical insulating material is disposed coaxially within said capacitor body with a portion of said first lead wire projecting from one end of said capacitor body and a portion of said second lead wire projecting from the other end of said capacitor body;

(d) ohmically bonding said first lead wire to one of said ribbons of electroconductive material; and, (e) ohmically bonding said second lead wire to the other of said ribbons of electroconductive material.

References Cited by the Examiner

UNITED STATES PATENTS

| 2,942,302 | 6/60 | Beyer | 317—260 |
| 3,012,176 | 12/61 | Williams | 317—260 |

FOREIGN PATENTS

| 566,492 | 1/45 | Great Britain. |
| 642,609 | 9/50 | Great Britain. |
| 585,787 | 10/59 | Canada. |

JOHN F. BURNS, *Primary Examiner.*

E. JAMES SAX, *Examiner.*